UNITED STATES PATENT OFFICE.

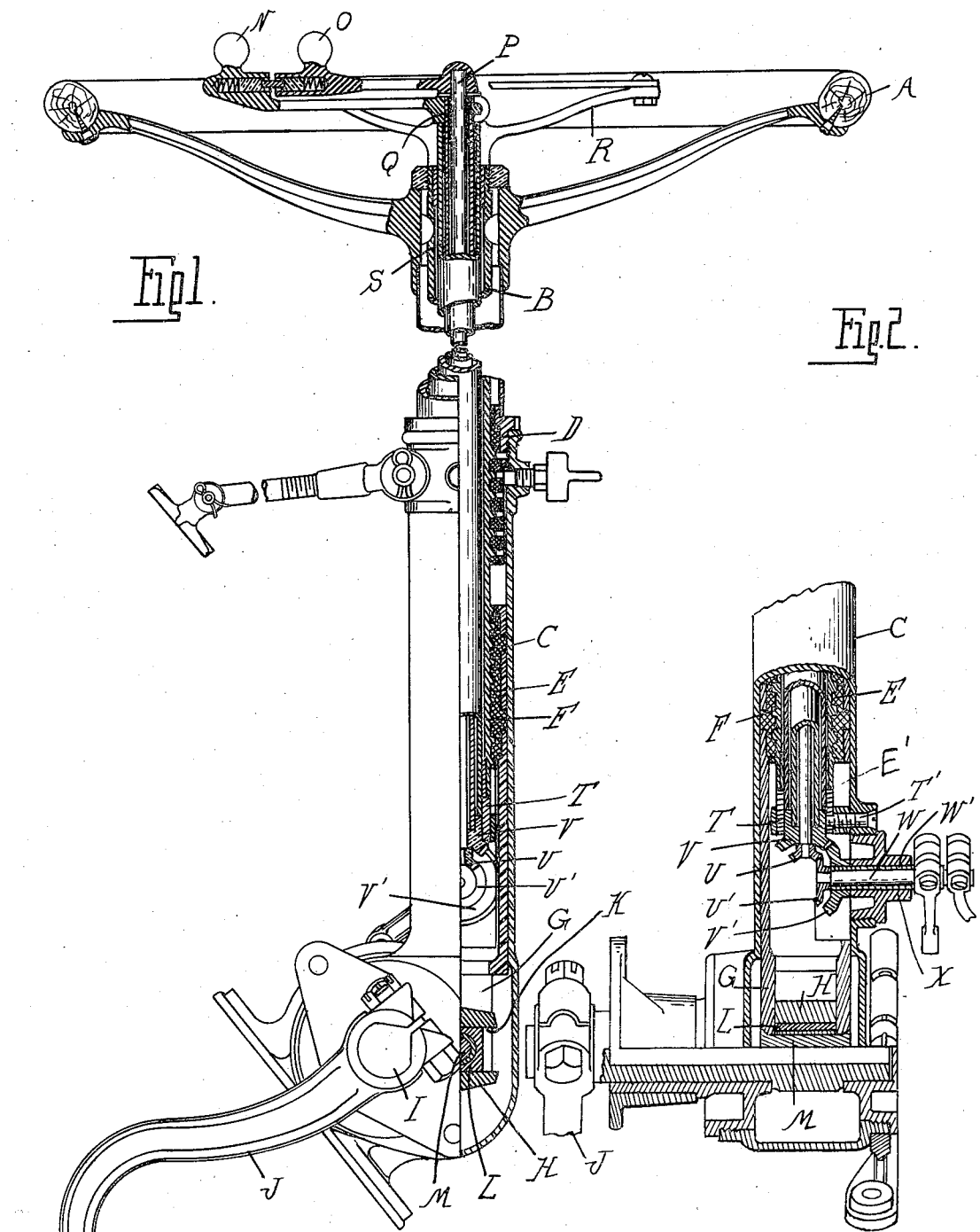

GEORGE W. DUNHAM, OF DETROIT, MICHIGAN, ASSIGNOR TO HUDSON MOTOR CAR COMPANY, OF DETROIT, MICHIGAN, A CORPORATION OF MICHIGAN.

STEERING-GEAR AND CONTROL MECHANISM FOR MOTOR-VEHICLES.

1,001,258. Specification of Letters Patent. Patented Aug. 22, 1911.

Application filed March 4, 1910. Serial No. 547,352.

*To all whom it may concern:*

Be it known that I, GEORGE W. DUNHAM, a citizen of the United States of America, residing at Detroit, in the county of Wayne and State of Michigan, have invented certain new and useful Improvements in Steering-Gear and Control Mechanism for Motor-Vehicles, of which the following is a specification, reference being had therein to the accompanying drawings.

The invention relates to steering gears for motor vehicles, of that type in which the rotation of the steering stem is transmitted to the rock shaft through the medium of a screw and nut.

It is the object of the invention to adapt this type of steering gear to be used in combination with a motor-control mechanism, which is located above the steering wheel, and consequently must be connected to the mechanism below by transmission means passing through the hollow steering stem. A difficulty encountered is that the simplest and most convenient location for the connection between the reciprocatory nut and the rock shaft is in axial alinement with the rotary steering stem, and thus these parts stand directly in the path of the control rods passing through the stem. With my improved construction, this difficulty is overcome by cutting away a portion of the nut member intermediate its points of engagement with the screw and the rock shaft to provide clearance for the connection between the control rods and the external mechanism operated thereby.

The invention, therefore, consists in the peculiar construction, arrangement and combination of parts as hereinafter set forth.

In the drawings—Figure 1 is a sectional elevation of a steering mechanism to which my improvements are applied; Fig. 2 is a longitudinal section through the lower portion of Fig. 1, and at right angles to the plane thereof.

A is the steering wheel of a motor vehicle, B the rotary stem therefor, C the stationary casing at the lower end of the stem, D a thrust bearing for the stem formed in the upper end of said casing, and E is a threaded nut engaging a screw F at the lower end of the stem and slidingly engaging the casing C. The lower end of the nut is bifurcated at G to embrace a rock arm H on the shaft I, which is journaled in bearings in the casing C, and is connected at its outer end with a rock arm J, which actuates the wheel-turning mechanism. The rock arm H is slotted at K to embrace a bearing block L journaled upon a pin M secured to the furcations G of the nut. Thus, whenever the stem B is rotated, the nut E, which is held from rotation by engagement with the rock arm, will be moved longitudinally of the casing, and through the connecting mechanism described will rock the shaft I and arm J.

The control mechanism is located above the steering wheel, and, as shown, comprises two independently adjustable control levers N and O, the latter being connected to a central stem P and the former to a surrounding sleeve or tubular stem Q, both passing through the steering stem B.

R is a stationary segment in connection with which the levers N and O are adjusted, and S is a stationary tubular stem to which said segment is secured, and which surrounds the stems P and Q and passes within the stem B to the lower end thereof. This stationary stem S is connected at its lower end with the stationary casing C through the medium of a collar T and screw T'.

U and V are bevel gears connected respectively to the stems P and Q at their lower ends and which intermesh with coöperating bevel gears U' and V' upon concentrically-arranged shafts W and W' extending at right angles to the axis of the steering stem. These shafts W and W' are journaled in a bearing X detachably secured to the side of the casing C, and preferably having a threaded engagement therewith.

To permit the arrangement of the parts as just described, the nut member E is cut away at E' a sufficient amount to clear the shafts W and W' and collar T in all positions of adjustment of the steering stem. This requires the slot E' to be of sufficient length to allow the maximum longitudinal movement of the nut member within the casing C, and to this end said casing and nut members are elongated so as to provide bearing portions at opposite ends of the cut away portion. Thus the pin M may be alined with the axis of the steering stem without any interference with the control mechanism which passes out from the stem above this point.

What I claim as my invention is:

1. The combination with a rotary steering stem, of a longitudinally movable member having a screw and nut engagement with said stem, a rock shaft connected to said longitudinally movable member, a control shaft passing through said rotary stem, and mechanism actuated by said control shaft passing laterally through said longitudinally movable member.

2. The combination with a rotary steering stem, of a stationary casing for the lower end of said stem, a thrust bearing for said stem within said casing, a member longitudinally movable within said casing having a screw and nut engagement with said stem, a rock arm actuated by said longitudinally movable member, a control shaft passing through said rotary stem, and mechanism actuated by said control shaft mounted in said casing and passing through an aperture in said longitudinally movable member.

3. The combination with a rotary steering stem, of a casing in which the lower end of said stem is journaled, a thrust bearing in said casing for said stem, a screw upon said stem below said thrust bearing, a nut member engaging said screw and longitudinally slidably engaging said casing, said nut member being cut away on one side intermediate its ends, a control shaft passing through said stem, a shaft extending laterally through the aperture in said nut member and bevel gears connecting said lateral shaft and the shaft within the stem.

4. The combination with a steering wheel, of a rotary stem on which said wheel is mounted, a casing in which the lower end of said stem is journaled, a longitudinally movable member having a screw and nut engagement with said stem and slidably engaging with said casing, said member being cut away at one side intermediate its ends, a stationary tubular member within said rotary stem secured to said casing through the aperture in said longitudinally movable member, a stationary segment mounted on said stationary tubular member above said steering wheel, a rotary shaft within said stationary tubular member, a control lever connected with said shaft, a laterally-extending shaft passing through the cut away portion of said longitudinally adjustable member, and bevel gears connecting said laterally-extending shaft with said rotary shaft within the steering stem.

5. The combination with a steering wheel, of a rotary stem on which said wheel is mounted, a casing in which the lower end of said stem is journaled, a longitudinally movable member having a screw and nut engagement with said stem and non-rotatively slidably engaging said casing, said member being cut away at one side intermediate its ends, a stationary tubular member within said rotary stem, a member forming a supporting bearing for said stationary tubular member extending out through the cut away portion and secured to said casing, a control shaft passing through said stationary tubular member, and mechanism actuated by said control shaft passing laterally through said longitudinally movable member.

6. The combination with a rotary steering stem, of a longitudinally movable member having a screw and nut engagement with said stem, a rock arm pivotally engaging said longitudinally movable member in axial alinement therewith, a control shaft passing through said stem, and mechanism actuated by said control shaft passing laterally through said longitudinally movable member.

In testimony whereof I affix my signature in presence of two witnesses.

GEORGE W. DUNHAM.

Witnesses:
D. D. ROWLANDS,
C. E. GREGORY.